(12) United States Patent
Rizzo

(10) Patent No.: US 8,662,966 B2
(45) Date of Patent: Mar. 4, 2014

(54) SHELLFISH CRACKING UTENSIL

(76) Inventor: Michael F. Rizzo, Cortlandt Manor, NY (US)

(*) Notice: Subject to any disclaimer, the term of this patent is extended or adjusted under 35 U.S.C. 154(b) by 607 days.

(21) Appl. No.: 13/013,032

(22) Filed: Jan. 25, 2011

(65) Prior Publication Data

US 2012/0190282 A1 Jul. 26, 2012

(51) Int. Cl.
*A22C 29/02* (2006.01)
(52) U.S. Cl.
USPC .................................................. 452/6
(58) Field of Classification Search
USPC ............... 452/6, 12, 13, 16, 17, 102–105
See application file for complete search history.

(56) References Cited

U.S. PATENT DOCUMENTS

| | | | |
|---|---|---|---|
| D50,119 S | 1/1917 | Bessolo | |
| 2,630,314 A * | 3/1953 | Cadwallader | 177/129 |
| 4,172,306 A | 10/1979 | Hopkins | |
| 4,519,136 A | 5/1985 | Walker | |
| 4,569,103 A | 2/1986 | Taurinskas | |
| 4,610,052 A | 9/1986 | Lubcke | |
| D307,374 S | 4/1990 | Lubcke | |
| D307,375 S | 4/1990 | Lubcke | |
| 5,403,230 A | 4/1995 | Capriglione, Sr. | |
| 5,586,931 A | 12/1996 | Williams, Jr. | |
| 5,613,904 A | 3/1997 | LaSalle et al. | |
| D386,362 S | 11/1997 | LaSalle et al. | |
| 6,019,673 A | 2/2000 | Saizon | |
| 6,817,937 B1 | 11/2004 | Merritt | |
| D501,376 S | 2/2005 | Heuck | |
| 7,121,939 B1 * | 10/2006 | Quaglino | 452/6 |
| 7,125,329 B2 | 10/2006 | Mindes | |
| 7,134,206 B2 * | 11/2006 | Bach | 30/120.1 |
| 7,169,033 B1 | 1/2007 | Colbert | |
| 7,367,876 B1 | 5/2008 | Denoff | |
| D592,466 S | 5/2009 | Cox et al. | |
| 8,382,562 B1 * | 2/2013 | Lavretsky | 452/137 |
| 2006/0143927 A1 | 7/2006 | Bach | |

OTHER PUBLICATIONS

"Sea-Shellers", www.spir-it.com.
"Sea-Shellers Open Shellfish Like a Zipper", www.youtube.com.
"Restaurant Equipment and Supplies", www.foodservicewarehouse.com.
"Kitchen Accessories", www.nesxtag.com.
"Lobster Utensils", www.amazon.com.
Spirit Foodservice, Inc. Webpages.

* cited by examiner

*Primary Examiner* — Richard Price, Jr.
(74) *Attorney, Agent, or Firm* — Karl F. Milde, Jr.; Eckert Seamans Cherin & Mellott, LLC

(57) ABSTRACT

A shellfish cracking utensil has a handle portion and a head portion, with the head portion comprising (a) a base region having a lower part and an upper part, with the lower part being connected to one end of the handle portion, and (b) first and second tines connected to, and extending outwardly from, the upper part of the base region. The tines are preferably of substantially equal length, extending in substantially parallel relationship and defining a gap between them for inserting a shell portion of a shellfish. The two tines are substantially prong-shaped with the second tine wider than the first tine. The second tine has a bump portion on an edge thereof facing the first tine, preferably near the end of the second tine.

32 Claims, 4 Drawing Sheets

SHELLFISH CRACKING UTENSIL

BACKGROUND OF THE INVENTION

The present invention relates to a forked utensil for cracking the shells of shellfish such as lobster, crawfish, crab and the like, and a method of using the same.

Numerous devices have been developed and used for cracking the shells of shellfish. Normally such devices take the form of a pliers or nutcracker with two tongs pivoted, respectively, at either the middle or at one end. Such devices are less than adequate, however, because they press the shell together, rather than opening it to expose the shellfish meat.

SUMMARY OF THE INVENTION

It is a principal object of the present invention to provide a shellfish cracking utensil, and a method of using the same, that avoids the disadvantages of the prior known utensils used for cracking shellfish shells.

It is a further object of the present invention to provide a shellfish cracking utensil which is simpler and substantially less expensive to manufacture than the prior known utensils used for cracking shellfish shells.

It is a further object of the present invention to provide a shellfish cracking utensil that may be used as a fork for spearing and removing meat from the cracked shell of a shellfish.

These objects, as well as further objects which will become apparent from the discussion that follows is achieved, in accordance with the present invention, by providing a shellfish cracking utensil having a handle portion and a head portion, with the head portion which comprises:

(a) a base region having a lower part and an upper part, with the lower part being connected to one end of the handle portion; and
(b) first and second tines connected to, and extending outwardly from, the upper part of the base region. The tines are preferably of substantially equal length, extending in substantially parallel relationship and defining a gap between them for inserting a part of a shellfish.

According to the invention, the first tine is substantially prong-shaped and the second tine is wider than the first tine.

Preferably the second tine is approximately twice or three times as wide as the first tine. Preferably also, the gap between the tines is approximately equal to, or approximately twice or three times the width of said first tine.

According to a particularly advantageous feature of the present invention, the second tine has a bump portion on an edge thereof facing said first tine, preferably adjacent to the end of the second tine.

This bump portion, which serves to apply pressure at a point on the shellfish shell, when the shell is inserted into the gap between the tines, may be of any shape but is preferably rounded for ease of use. In particular, the bump portion is preferably substantially circular in shape and extends outward from said second tine in a direction toward said first tine and toward the ends of said first and second tine.

Advantageously the bump portion has approximately the same width as the remainder of said second tine.

The shellfish cracking utensil is simple and easy to manufacture and use, especially if the handle portion and the head portion are integrally formed of a single piece of flat stock of a material such as metal or ABS plastic. The material must be relatively strong to withstand the forces applied when used to crack the shell of a shellfish.

In operation, a user grasps the handle of the utensil and inserts a shell portion of the shellfish into the gap in the head portion, with one of the tines outside of the shell and the other tine beneath the shell. The user then executes a repeated rocking or lifting motion of the handle portion while pressing the head portion deeper into the shellfish, thereby breaking the shell portion along a line to form an opening.

In order to spear the shellfish meat after cracking the shell, the first and second tines of the shellfish cracking utensil preferably have pointed ends. Alternatively or in addition, handle portion of the utensil may have at least one tine, and preferably two tines, on its opposite end for spearing shellfish meat.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
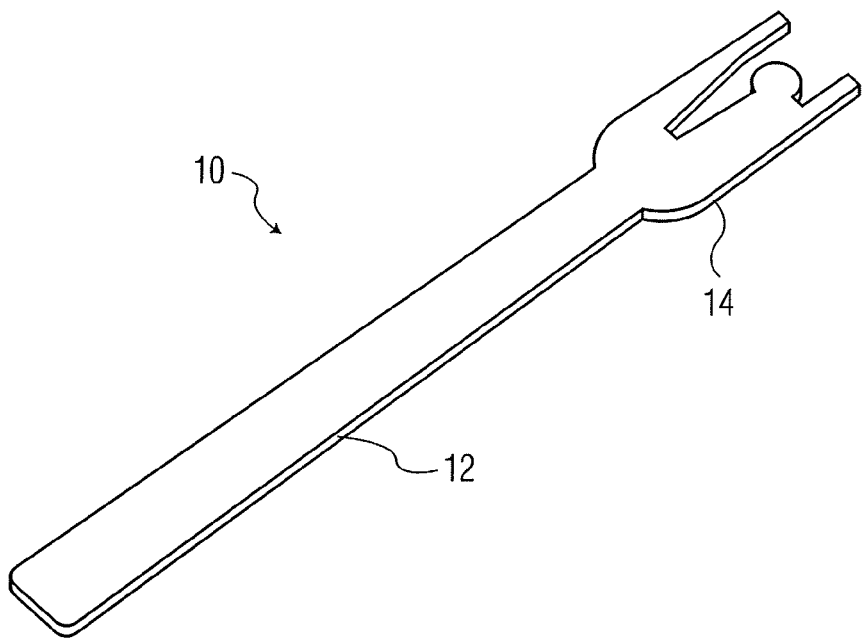
FIG. 1 is a perspective view of a preferred embodiment of the shellfish cracking utensil according to the present invention.

The preferred embodiments of the present invention will now be described with reference to FIGS. 1-5 of the drawings. Identical elements in the various figures are identified with the same reference numerals.

Figure 2:
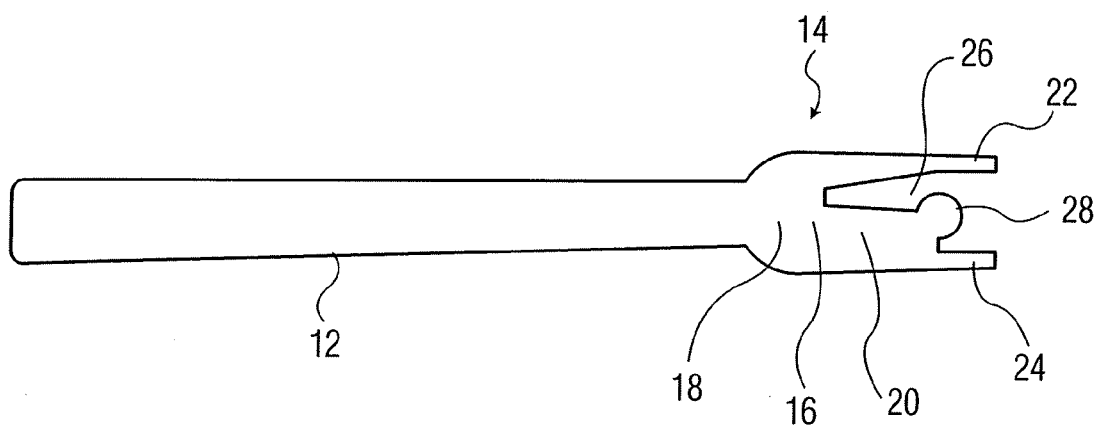
FIG. 2 is a plan view of the shellfish cracking utensil of FIG. 1.

FIGS. 1 and 2 show a preferred embodiment of the shellfish cracking utensil or tool 10 according to the present invention. The utensil 10 has a handle portion 12 and a head portion 14 formed from a single, common piece of flat stock material. The material must be relatively strong, depending on the thickness of the flat stock. Preferred materials are a metal alloy and ABS plastic.

As is best illustrated in FIG. 2, the head portion 14 has a base region 16 having a lower part 18 and an upper part 20, with the lower part 18 being connected to one end of the handle portion 12. First and second tines 22 and 24, respectively are connected to, and extend outwardly from, the upper part 20 of the base region 16. The tines 22 and 24 are of substantially equal length, extending in substantially parallel relationship and defining a gap 26 between them for inserting a part of a shellfish. The first tine 22 is substantially prong-shaped, whereas the second tine 24 is wider than the first tine. The second tine 24 has a bump portion 28 on an edge thereof facing said first tine 22, adjacent to the free end of the second tine.

Figure 3A:
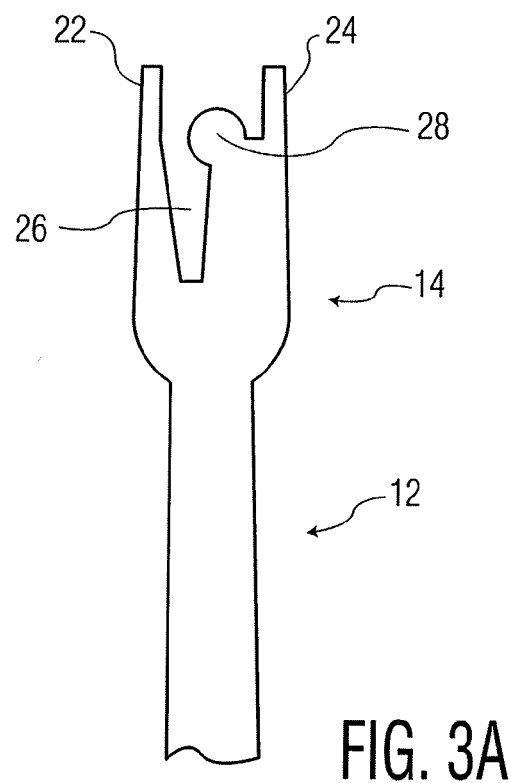
FIGS. 3a, 3b, 3c and 3d are plan views of various alternative embodiments of the shellfish cracking utensil according to the present invention.
Figure 3B:
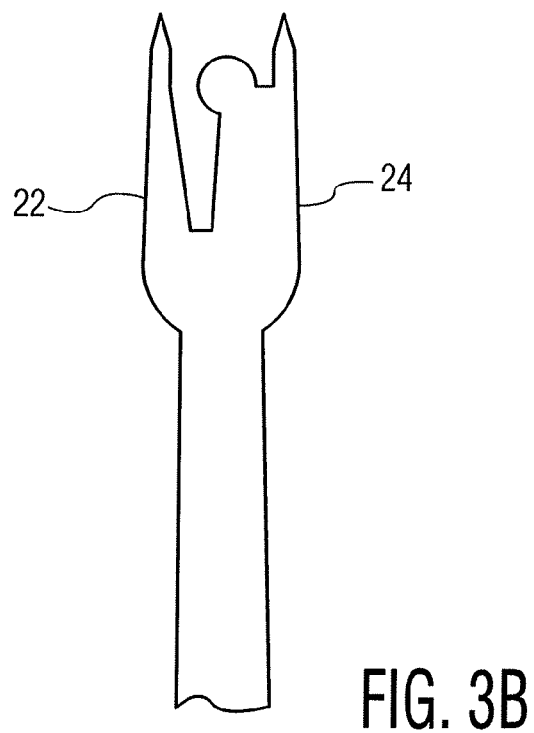
Figure 3C:
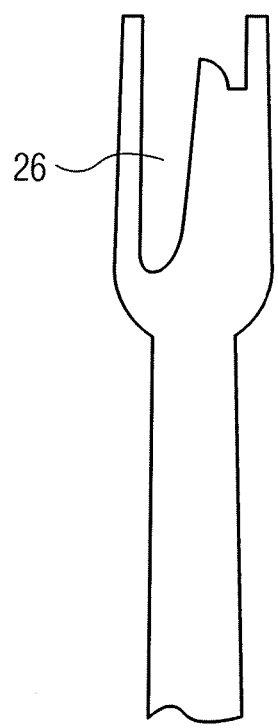
Figure 3D:
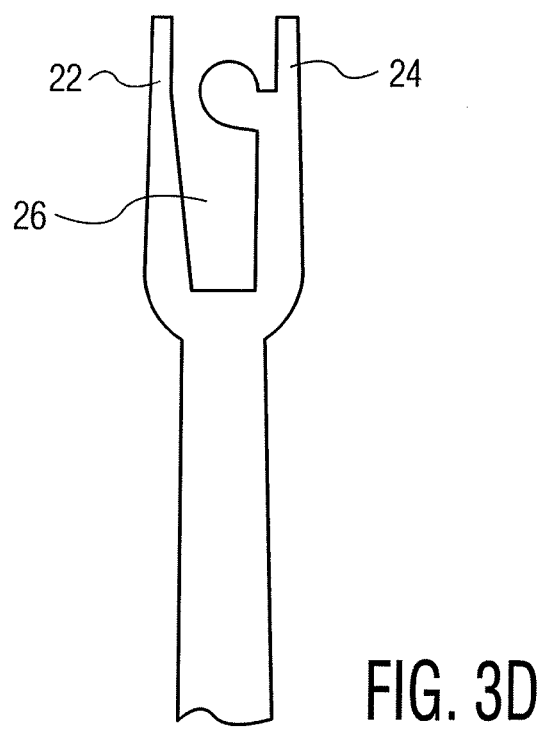

FIGS. 3a-3d illustrate various alternative embodiments of the head portion 14 of the utensil 10. For comparison, FIG. 3a is the same preferred embodiment as is illustrated in FIGS. 1 and 2, with the gap 26 approximately equal in width to the tine 22, and the tine 24 approximately three times the width of the tine 22. FIG. 3b shows an embodiment, similar to that of FIG. 3a, with the tines 22 and 24 pointed for ease of use in spearing meat from a cracked shellfish. FIG. 3c shows an embodiment of the utensil without the bump portion 28 and in which the gap 26 is about twice the width, and the tine 24 is about three times the width of the tine 22. Finally, FIG. 3d shows an embodiment of the utensil in which the gap is about three times the width of the tine 22 and the two tines 22 and 24 are approximately equal in width.

Figure 4:
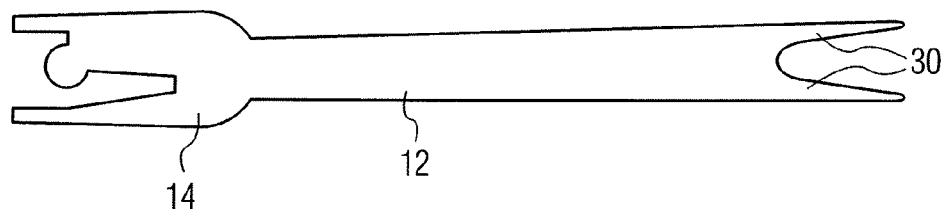
FIG. 4 is a plan view of still another embodiment of the shellfish cracking utensil according to the present invention.

FIG. 4 shows still another embodiment of the utensil according to the present invention. In this embodiment the end of the handle portion 12, which is opposite to the end connected to the head portion 14, is provided with two forked tines 30 for spearing meat from the shellfish.

Figure 5:
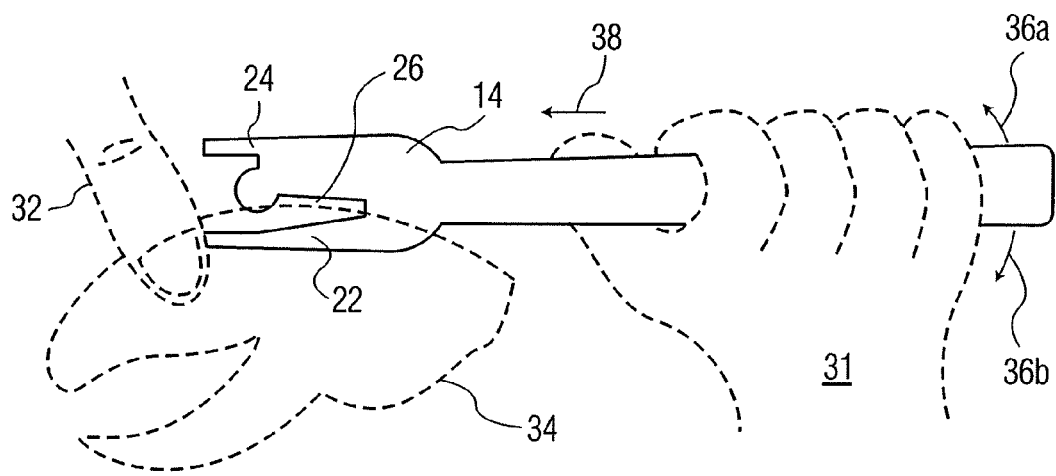
FIG. 5 is a diagrammatic view showing a method of using the utensil of FIG. 1.

FIG. 5 illustrates a method of using the utensil according to the present invention, which includes the following steps:

1) gripping the handle portion 12 with one hand 31 while holding a shell 34 of a shellfish with the other hand 32;
2) inserting a shell portion of the shellfish into the gap 26 in the head portion 14 with the first tine 22 beneath the shell and the second tine 24 outside of the shell; and
3) executing a repeated lifting (rocking) motion of the handle portion (as shown by arrows 36a and 36b) while pressing the head portion 14 deeper into the shellfish (as shown by arrow 38), thereby breaking the shell portion along a line to form an opening. The rocking motion 36a and 36b forces the bump portion of the utensil to break the shell while the base of the tine 22 simultaneously cuts the shell a short distance behind to form an opening.

After the shell is cracked open along a line, the utensil may be removed from the shellfish and the opening widened by hand to reveal and expose the shellfish meat. The meat can then be removed from the shell opening either by hand or with the use of a fork.

There has thus been shown and described a novel shellfish cracking utensil which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A shellfish cracking utensil having a handle portion and a head portion, said head portion comprising:
   (a) a base region having a lower part and an upper part, said lower part being connected to one end of the handle portion; and
   (b) first and second tines connected to, and extending outwardly from, said upper part of said base region, said tines being or substantially equal length and extending in substantially parallel relationship and defining a gap between them for inserting part of a shellfish;
wherein said second tine has a bump portion on an edge thereof facing side first tine.

2. The shellfish cracking utensil defined in claim 1, wherein said second tine approximately twice as wide as said first tine.

3. The shellfish cracking utensil defined in claim 1, wherein said second tine is approximately three times wider than said first tine.

4. The shellfish cracking utensil defined in claim 1, wherein said gap is approximately the width of said first tine.

5. The shellfish cracking utensil defined in claim 1, wherein said gap is approximately twice the width of said first tine.

6. The shellfish cracking utensil defined in claim 1, wherein said gap is approximately three times the width of said first tine.

7. The shellfish cracking utensil defined in claim 1, wherein said bump portion is adjacent the end of said second tine.

8. The shellfish cracking utensil defined in claim 7, wherein said bump portion is substantially circular in shape.

9. The shellfish cracking utensil defined in claim 8, wherein said bump portion has approximately the same width as the remainder of said second tine.

10. The shellfish cracking tool defined in claim 9, wherein said material is metal.

11. The shellfish cracking tool defined in claim 9, wherein said material is ABS plastic.

12. The shellfish cracking utensil defined in claim 7, wherein said bump portion extends outward from said second tine in a direction toward said first tine and toward the ends of said first and second tine.

13. The shellfish cracking utensil defined in claim 1, wherein said handle portion and said head portion are integrally formed of a common piece of material.

14. The shellfish cracking tool defined in claim 13, wherein said piece of material is substantially flat.

15. The shellfish cracking utensil defined in claim 1, wherein said first and second tines have pointed ends.

16. The shellfish cracking utensil defined in claim 1, said handle portion has at least one tine on an opposite end for spearing meat from the shellfish.

17. The shellfish cracking utensil defined in claim 16, wherein said handle portion has two tines on said opposite end.

18. A shellfish cracking utensil having a handle portion and head portion, said head portion comprising:
   (a) a base region having a lower part and an upper part, said lower part being connected to one end of the handle portion; and
   (b) first and second tines connected to, and extending outwardly from, said upper part of said base region, said tines extending in substantially parallel relationship and defining a gap between them for inserting a part of a shellfish;
wherein said second tine has a bump portion on an edge thereof facing said first tine.

19. The shellfish cracking utensil defined in claim 18, wherein said bump portion is adjacent the end of said second tine.

20. The shellfish cracking utensil defined in claim 19, wherein said bump portion is substantially circular in shape.

21. The shellfish cracking utensil defined in claim 20, wherein said bump portion has approximately the same width as the remainder of said second tine.

22. The shellfish cracking utensil defined in claim 19, wherein said bump portion extends outward from said second tine in a direction toward said first tine and toward the ends of said first and second tine.

23. The shellfish cracking utensil defined in claim 18, wherein said handle portion and said head portion are integrally formed of a common piece of material.

24. The shellfish cracking tool defined in claim 18, wherein said piece of material is substantially flat.

25. The shellfish cracking tool defined in claim 24, wherein said piece of material is metal.

26. The shellfish cracking tool defined in claim 24, wherein said material is ABS plastic.

27. The shellfish cracking utensil defined in claim 18, wherein said first and second tines have pointed ends.

28. The shellfish cracking utensil defined in claim 18, said handle portion has at least one tine on an opposite end for spearing meat from the shellfish.

29. The shellfish cracking utensil defined in claim 28, wherein said handle portion has two tines on said opposite end.

30. The shellfish cracking utensil defined in claim 18, wherein said second tine is wider than said first tine.

31. The shellfish cracking utensil defined in claim 18, wherein said second tine is approximately twice as wide as said first tine.

32. The shellfish cracking utensil defined in claim 18, wherein said second tine is approximately three times wider than said first tine.

\* \* \* \* \*